United States Patent [19]

Palmer et al.

[11] 4,071,639
[45] Jan. 31, 1978

[54] COATING MATERIAL AND METHOD

[75] Inventors: David Nelson Palmer, Tolland; Stanley Heikoff, South Windsor, both of Conn.

[73] Assignee: Combustion Engineering, Inc., Windsor, Conn.

[21] Appl. No.: 624,695

[22] Filed: Oct. 22, 1975

[51] Int. Cl.$^2$ .................. B65B 33/00; C08J 3/00; C08L 61/00
[52] U.S. Cl. .................................. 427/156; 176/78; 260/2.3; 260/29.1 SB; 260/29.6 MN; 427/154; 260/29.6 E
[58] Field of Search ............... 427/5, 154, 155, 156; 260/29.1 SB, 29.6 E, 29.6 MN; 176/78

[56] References Cited

U.S. PATENT DOCUMENTS

| | | | |
|---|---|---|---|
| 2,372,982 | 4/1945 | Richards et al. | 427/155 |
| 2,540,996 | 2/1951 | Ryden | 427/155 |
| 3,423,225 | 1/1969 | Coney | 427/154 |
| 3,583,932 | 6/1971 | Benton et al. | 427/154 |
| 3,699,067 | 10/1972 | Stockman | 260/29.1 SB |

Primary Examiner—Ronald H. Smith
Assistant Examiner—S. Silverberg
Attorney, Agent, or Firm—Richard H. Berneike

[57] ABSTRACT

A removable temporary coating material for providing scratch protection particularly for nuclear components is disclosed. The coating contains a methacrylic or acrylic/methacrylic polymer in a water vehicle. Selected surfactants, lubricants and reactive solubilizing agents are also included to provide the desired lubrication and scratch resistance and to provide a coating which is readily removed so as to leave no deleterious residue. Techniques for removing and recovering the coating are also disclosed.

6 Claims, No Drawings

COATING MATERIAL AND METHOD

BACKGROUND OF THE INVENTION

During the assembly of parts where one metal surface slides across another metal surface, it is often desirable and sometimes necessary to provide a coating on the metal parts to provide lubrication to prevent scratching. An example of such a situation is during the assembly of nuclear fuel cores when the fuel rods are inserted into fuel bundle spacer grids. The insertion forces on the fuel rods can be significant and can be greatly reduced by the use of a lubricant. It may also be desirable to provide a protective coating either on the fuel rods or on the spacer grids which will prevent any chances of scratching during the assembly process. Any coating material which is used must be removable from the surfaces after assembly since these coating materials cannot be left in the reactor during opration. Not only is it desirable to have a relatively simple decoating process, but the decoating process must also remove substantially all of the coating material so that residual, contaminating materials do not remain. For example, it is necessary to decoat fuel rods to a surface carbon content of no greater than 0.01 micrograms of carbon per square centimeter or rod surface area. Other factors to be considered in selecting a coating material are that it be nonflammable, nontoxic and nonexplosive so that extra ordinary precautions are not necessary during the process. Also, the coating should be such that the waste disposal problem during decoating is relatively simple and economical. The coating should also have sufficient lubricity, adhesion and strength to impart more than adquate lubrication and scratch prevention with a relatively thin coat such as 0.5 to 1.0 mils thickness The coating materials which are currently available for such a purpose are either hazardous or they are not readily removed from the surface or leave trace materials behind which are unsuitable in a nuclear reactor environment.

SUMMARY OF THE INVENTION

An object of the present invention is to provide a coating material which can be used to coat metal surfaces for lubrication purposes and to impart scratch resistance thereto. More particularly the invention involves a coating material which can be easily applied and easily removed after its function has been served. The particular coating material of the present invention contains a methacrylic or acrylic/methacrylic polymer which has been rendered soluble together with lubricants. The coating is specifically formulated so as to have the necessary adhesion properties, the necessary lubricity and abrasion resistance, and to be readily decoated without leaving excessive residues.

DESCRIPTION OF THE PREFERRED EMBODIMENT

As indicated, the present invention involves the use of a methacrylic or acrylic/methacrylic polymer which is formed from the methyl esters of acrylic acid and methacrylic acid such that the molecular weight will be in the range of $10^3$ to $10^6$ and so that there will be from 1 to 25 percent active carboxylic acid groups on the chain. The polymer must be capable of being rendered soluble in hot or cold water or an alkaline solution, capable of forming a scratch resistant film when applied to a substrate, and capable of forming a matrix in which lubricants can be incorporated. One such material is sold by the B. F. Goodrich Company of Cleveland, Ohio under the trademark "Carboset 525".

The methacrylic or acrylic/methacrylic polymer will form a scratch resistant coating and act as a lubricant and yet it can readily be removed by relatively simple processes as will be explained hereinafter. The polymer as well as all of the other ingredients of the coating material, contains no chlorine, fluorine, sulfur, lead or mercury, which could not be tolerated in a reactor environment, and it can be readily decoated such that any remaining carbon residue it at a sufficiently low level. Furthermore, the removed coating material is biodegradable thus simplifing waste management and making coating material recovery relatively simple and economical.

Included in the formulation with the polymer are a vehicle, a surfactant which acts as a wetting agent to promote the adhesion of the coating to the surface, lubricants and a reactive solubilizing agent which reacts with the polymer to render it soluble.

The vehicle which is employed is water and preferably deionized water from which the ions which could not be tolerated in a nuclear reactor environment have been removed.

The preferred surfactant for the present invention is dimethyl polyoxyalkylene ether siloxane copolymer. One such material is manufactured by the General Electric Company and sold under the manufacturer's designation "SF-1066". This material has a nominal viscosity of 1200 to 1500 centistokes at 25° C. However, other surfactants can be used which are water soluble and stable in the pH range of 8 to 11 and which do not react or complex with the polymer or generally render the polymer unreactive or precipitate the polymer from the water vehicle. One example would be polysiloxane ether copolymer, which is sold by the General Electric Company under the designation "SF-1098". This material has a nominal viscosity of 125 centistokes at 25° C. As pointed out above, the surfactant that is used must contain no chlorine, fluorine, sulfur, lead or mercury. The surfactant increases the adhesive properties which would otherwise be reduced by the lubricants.

The lubricant component of the coating material comprises a mixture of glycerin or a glycerin type lubricant and a polyvinyl or polypheyl silicone material. The glycerin internally plasticizes the polymer chain to relieve stresses on the chain when the coating has cured to a film network and the film is stressed such as by the surface contact of the fuel rods being inserted into the fuel assembly. It has been found that only glycerin or glycerin type lubricants will remain internal to the polymer film and not interfere with film adhesion to the substrate.

Functionally the polyvinyl or polyphenyl silicone lubricant remains discretely dispersed in the coating matrix and blooms to the surface of the coating when pressure is applied. It thus acts as a lubricant film on the coating of sufficient strength to assist in reducing frictional forces. Of all the lubricants that should bloom external to the coating, only the polyvinyl and polyphenyl silicones were found to perform this function and at the same time not interfere with the film adhesion to the substrate. The preferred external lubricant is a polymethyl phenyl silicone such as the material sold by Dow Corning Corporation under the trademark "DC-710". It should be noted that there must be a balance between the internal and external lubrication and the coating adhesion since coating adhesion is necessary to avoid coating rupture.

The term reactive solubilizinh agent as used herein refers to a material which will ionize in the water vehicle and form alkaline solutions and species that react with the acidic carboxylic hydrogen of the polymer rendering the polymer soluble in the vehicle. Dependent on the degree of ionization and activity of the ionized species formed, the coating after cure will be either cold water, hot water or water/detergent soluble. The reactive solubilizing agent also assists in the development of a cohesive coating network upon exposure to air and evaporation of the vehicle.

The preferred reactive solubilizing agent is piperidine which produces a superior, cold water soluble coating. It is cold water soluble because it shows a poor degree of ionization in water while producing a relatively high water pH. A number of other reactive solubilizing agents which produce water soluble coatings are as follows:

morpholine (tetrahydro-1, 4-oxazine)
triethanolamine
triethylamine
hydrazine (30% in $H_2O$)
monoethanolamine
triethylenetetraamine In addition to the reactive solubilizing agents listed above which form water soluble coatings, reactive solubilizing agents which form coatings soluble in an alkaline detergent solution may also be employed. Such reactive solublizing agents are as follows:

sodium triphosphate
sodium metasilicate
sodium hydroxide
pyrrole
N-methyl-2-pyrrolidone
pyridine
N-N'-dimethyl formamide
formamide
ammonium hydroxide (28–30% in $H_2O$)

A formulation for one embodiment of the invention is as follows:

| Function | Materials | Preferred Parts By Weight | Range Parts By Weight |
|---|---|---|---|
| Resin Binder | Alkaline soluble methyl vinyl acrylic | 100.00 | 100 |
| Vehicle | Deionized water | 450.00 | 200–450 |
| Surfactant | Dimethyl polyoxyalkylene ether siloxane copolymer | 2.89 | 0.75–3.00 |
| Lubricant A | Glycerin | 3.46 | 1.00–4.00 |
| Lubricant B | Polymethyl phenyl silicone | 1.45 | 0.50–1.50 |
| Reactive Solubilizing Agent | Piperidine | 22.50 | 10–30 |

Each of the reactive solubilizing agents except the ammonium hydroxide is used in the same proportion as the piperidine listed above. The ammonium hydroxide is a 12M (28–30%) ammonia solution in water which is used in the ratio of from 10 to 15 (preferably 12.0) parts by weight solution to 100 parts by weight solution to 100 parts by weight resin binder.

The surfaces to be coated are first cleaned and degreased by any conventional technique. The coating may be applied by dipping, spraying or electrocoating. Dip coating involves dipping the object for about 60 seconds and then allowing it to air cure for the required period of time. The spray coating process is a conventional spraying operating which is continued until the desired thickness of coating has been applied. In electrocoating, the object is submerged in the coating solution and then connected with a carbon or inert metal connection to a D.C. power source with the object being the cathode. Another similar carbon or inert metal electrode is placed in the coating solution and an e.m.f. of 10–50 volts is applied for a specific period of time depending on the desired film coating thickness. In each case, the coating is air cured. At room temperature of about 72° F, this curing process requires from 24 to 48 hours while curing at 90° F to 100° F requires about 8 hours. The temperature should not be allowed to exceed 100° F since the coating melts or can degrade at relatively low temperatures. After the coating has been applied and cured, the parts may be assembled as, for example, by inserting the nuclear fuel rods into the spacer grid. As previously stated, either the fuel rod itself or the grid may be coated. It should be pointed out that some of the coatings will be hard while some others will be slightly soft depending on the type and amount of reactive solubilizing agent which is used. This is due to the varying degrees of reaction of reactive solubilizing agent with oxygen from air exposure. If the fuel rods are coated, a hard coating should be used to provide maximum protection to the rods. However, if the grids are coated, a softer, more flexible coating should be used so that the coating will not scratch the rod. In other words, if the object to be protected (the rod) is coated, the coating should be hard while if the other object (the grid) is to be coated, the coating should be softer and more flexible. Some of the harder coatings are those reacted with N-methyl-2-pyrrolidone and sodium metasilicate while some of the softer coatings are reacted with triethanolamine, and hydrazine.

After assembly, the coating is removed. In the case of the water soluble coatings, decoating is accomplished by soaking the coated object in water at room temperature (about 72° F) for up to one hour followed by rinsing with water at room temperature. The soak and rinse water are then sent to the coating reclamation system as will be explained hereinafter. In order to assure complete removal of the coating; the object is next soaked in 180° F water for up to one hour followed by rinsing with water at room temperature and then another 10° F soak for up to one hour. The object is then dried such as by heating to 212° F.

The non-water soluble coatings are all removable with an alkaline detergent solution such as sodium phosphate. The first step in the decoating process is to soak the object for one hour in a 5 percent solution of sodium phosphate at 180° F. This decoating solution is then sent to reclamation. The object is then rinsed with 72° F water followed by another one hour soak in a 5 percent sodium phosphate solution at 180° F. This soak is followed by a rinse at 72° F and then a rinse at 180° F which is followed by drying of the object.

In addition to using a sodium phosphate solution for this decoating operation, similar solutions of ammonium hydroxide or sodium silicate may be used. Also, in either of the decoating systems, it is helpful to include from 0.5 to 1.5 percent by volume of a surfactant such as demethyl polyoxyalpylene ether silicone to promote the wetting of the coating for more rapid dissolution.

The coating reclamation process involves passing the water solution of the decoated polymer through an ion exchange column which will concentrate the polymer through an ion exchange resin. For example, the resin sold under the trademark "Amberlyst A-27" by Rhom and Hass, Inc. may be used. The polymer is concentrated on the ion exchange resin and the water-solvent mixture is transferred to a hold up tank. The concentrated polymer is then eluted from the ion exchange resin with a suitable solvent having a high vapor pressure and low boiling point such as one of the reactive solubilizing agents or reversed flushed from the resin system. The eluted polymer is then charged into a hold up tank where more polymer is added to adjust the polymer level to the proper coating concentration. The mixture of solvent and water from the ion exchange column may be vacuum distilled or steam distilled to reclaim the reactive solubilizing agent.

Another technique which may be used to reclaim the polymer involves placing an inert electrode system of either carbon or a noble metal of sufficiently large surface area into the decoated solution to be reclaimed. An e.m.f. of sufficient intensity is applied to the electrode system. After a pre-determined period of time, the scavenging electrode is removed from the decoating solution and the coating material deposited on the surface of the electrode is removed by solvents or by mechanical means.

What is claimed is:

1. A removable, temporary coating material for providing a lubricating and scratch protective coating on an object which is to be located in a nuclear reactor environment, said coating containing no contaminating chlorine, fluorine, sulfur, lead or mercury and comprising:
    a. 100 parts by weight of a polymer selected from the group consisting of polymers formed from the methyl esters of methacrylic acid and polymer formed from the combination of the methyl esters of acrylic acid and methacrylic acid such that the molecular weight will be in the range of $10^3$ to $10^6$ and such that there will be from 1 to 25 percent active carboxylic acid groups on the polymer chain, said polymer being capable of being rendered soluble in water and capable of forming a matrix in which lubricants can be incorporated;
    b. 200 to 450 parts by weight water;
    c. 0.75 to 3.0 parts by weight of a surfactant;
    d. 1.00 to 4.00 parts by weight of glycerin;
    e. 0.50 to 1.50 parts by weight of a lubricant selected from the group consisting of polyvinyl silicone and polyphenyl silicone, and;
    f. 10 to 30 parts by weight of a reactive solubilizing agent which will render said polymer soluble in water.

2. A coating material as recited in claim 1 wherein said surfactant is dimethyl polyoxyalkylene ether siloxane copolymer.

3. A coating material as recited in claim 1 wherein said reactive solubilizing agent is selected from the group consisting of piperidine, morpholine, triethanolamine, triethylamine, hydrazine, monoethanolamine, triethylenetetraamine, sodium triphosphate, sodium metasilicate, sodium hydroxide, pyrolle, N-methyl-2-pyrrolidone, pyridine, N-N'-dimethyl formamide, formamide and ammonium hydroxide.

4. A coating material as recited in claim 1 wherein said coating is water soluble and wherein said reactive solubilizing agent is selected from the group consisting of piperidine, morpholine, thriethanolamine, triethylamine, hydrazine, monoethanolamine and triethlenetetraamine.

5. A coating material as recited in claim 1 wherein said coating is soluble in an alkaline detergent solution and wherein said reactive solublizing agent is selected from the group consisting of sodium triphosphate, sodium metasilicate, sodium hydroxide, pyrolle, N-methyl-2-pyriolidone, pyridine N-N'-dimethyl formamide, formamide and ammonium hydroxide.

6. A method of temporarily protecting and lubricating the clean surface of an object which is to be located in a nuclear reactor environment comprising the steps of:
    a coating said object with a material containing no contaminating chlorine, fluorine, sulfur, lead or mercury comprising:
        A. 100 parts by weight of a polymer selected from the group consisting of polymer formed from the methyl esters of methacrylic acid and polymers formed from the combination of the methyl esters of acrylic acid and methacrylic acid such that the molecular weight will be in the range of $10^3$ to $10^6$ and such that there will be from 1 to 25 percent active carboxylic acid group on the polymer chain, said polymer being capable of being rendered soluble in water and capable of forming a matrix in which lubricants can be incorporated;
        B. 200 to 450 parts by weight water;
        C. 0.75 to 3.00 parts by weight of surfactant;
        D. 1.00 to 4.00 parts by weight of glycerin;
        0.50 to 1.50 parts by weight of a lubricant selected from the group consisting of polyvinyl silicone and polyphenyl silicone; and
        F. 10 to 30 parts by weight of a reactive solubilizing agent which will render said polymer soluble in water,
    b. permitting said coating to cure, and
    c. removing said coating from said object with a solvent for said coating.

* * * * *

UNITED STATES PATENT OFFICE
CERTIFICATE OF CORRECTION

PATENT NO. : 4,071,639
DATED : January 31, 1978
INVENTOR(S) : David Nelson Palmer and Stanley Heikoff It is certified that error appears in the above-identified patent and that said Letters Patent are hereby corrected as shown below:

Column 1, line 26 change "or" to --of--;

Column 1, line 34 change "adquate" to --adequate--;

Column 2, line 12 change "it" to --is--;

Column 3, line 3 change "solubilizinh" to --solubilizing--;

Column 4, line 47 change "10°" to --180°--;

Column 6, line 23 after "pyridine" insert --,--;

Column 6, line 29 after "a" (first occurrence) insert -- . --; and

Column 6, line 46 before "0.50" insert --E.--

Signed and Sealed this

Third Day of April 1979

[SEAL]

Attest:

RUTH C. MASON
Attesting Officer

DONALD W. BANNER
Commissioner of Patents and Trademarks